United States Patent

Drews et al.

[11] Patent Number: 4,658,641
[45] Date of Patent: Apr. 21, 1987

[54] METHOD AND APPARATUS FOR MEASURING THE FLOW RATE OF A FLOWING MEDIUM

[75] Inventors: Ulrich Drews, Vaihingen-Pulverdingen; Josef Kleinhans, Ludwigsburg, both of Fed. Rep. of Germany

[73] Assignee: Robert Bosch GmbH, Stuttgart, Fed. Rep. of Germany

[21] Appl. No.: 771,991

[22] Filed: Sep. 3, 1985

[30] Foreign Application Priority Data

Sep. 12, 1984 [DE] Fed. Rep. of Germany ....... 3433368

[51] Int. Cl.$^4$ .................. G01M 19/00; G01F 1/68
[52] U.S. Cl. .................... 73/118.2; 73/204
[58] Field of Search ............ 73/202, 204, 494, 118.1, 73/118.2

[56] References Cited

U.S. PATENT DOCUMENTS

| | | | |
|---|---|---|---|
| 3,747,577 | 7/1973 | Mauch et al. | 73/202 |
| 4,334,186 | 6/1982 | Sasayama et al. | 123/494 |
| 4,505,248 | 3/1985 | Yozawa et al. | 123/494 |
| 4,562,731 | 1/1986 | Nishimura et al. | 73/202 |

FOREIGN PATENT DOCUMENTS 0974275 11/1982 U.S.S.R. ................ 73/204

Primary Examiner—Stewart J. Levy
Assistant Examiner—Robert R. Raevis
Attorney, Agent, or Firm—Walter Ottesen

[57] ABSTRACT

A method and an apparatus are disclosed for determining the flow rate of a flowing medium such as the amount of air supplied to an internal combustion engine. The apparatus includes at least one temperature-dependent resistor arranged in the flowing medium. For this purpose, an arrangement is provided which applies a quantity dependent on at least the flow rate to the temperature-dependent resistor. The method includes the step of abruptly reducing the flow rate dependent quantity to a value such as approximately zero in the presence of a flow-rate value lying below a predeterminable threshold value. Because the reduction takes place only for a predetermined period of time, normal operation will be resumed automatically when the flow rate rises again. A hot-wire air-flow sensor is arranged in the intake pipe of an internal combustion engine and the output signals thereof are a measure of the amount of air inducted by the internal combustion engine.

17 Claims, 4 Drawing Figures

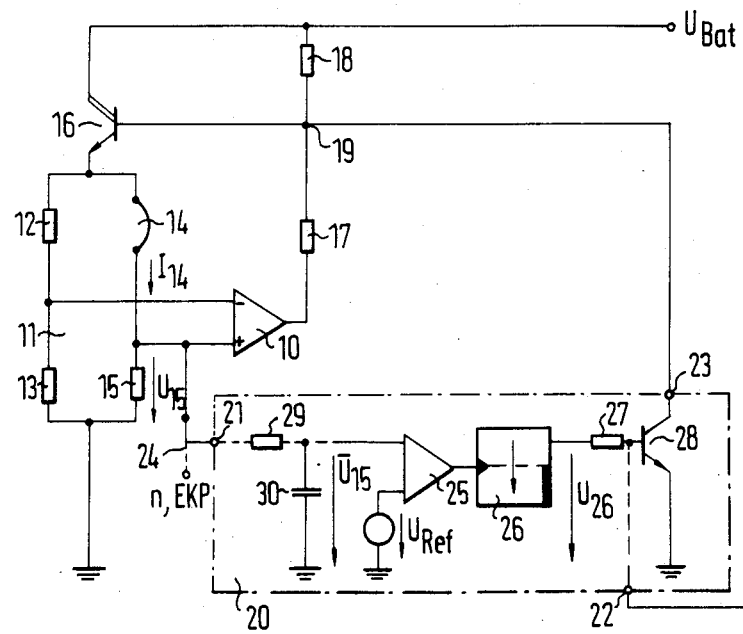
FIG.1
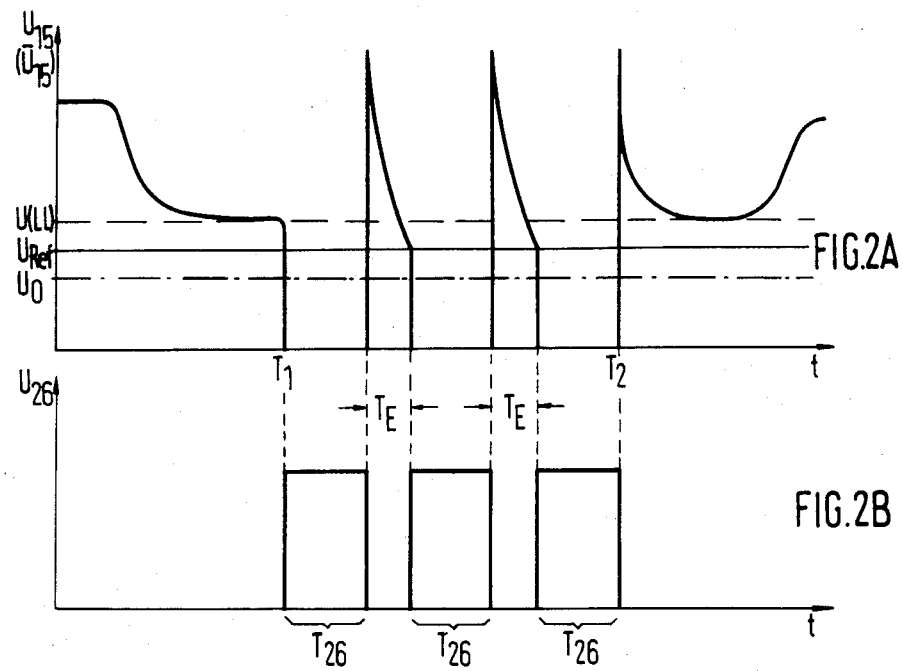
FIG.2A
FIG.2B

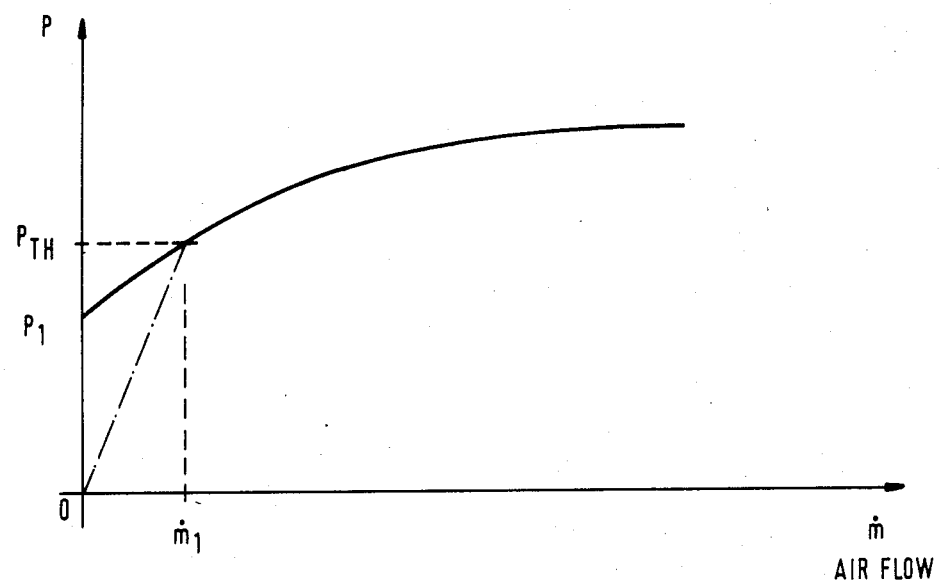

METHOD AND APPARATUS FOR MEASURING THE FLOW RATE OF A FLOWING MEDIUM

FIELD OF THE INVENTION

The invention relates to a method for measuring the flow rate of a flowing medium such as the mass of air conducted to an internal combustion engine. An apparatus for carrying out the method is also disclosed.

BACKGROUND OF THE INVENTION

An apparatus of the aforementioned type is already known from U.S. Pat. No. 3,747,577. This patent discloses an apparatus wherein a temperature-dependent resistor is arranged in a branch of a measuring bridge. The bridge is dimensioned such that the temperature-dependent resistor, as a result of the high current flowing therethrough, is heated to a high temperature which is above the temperature of the flowing medium. The measuring principle of this apparatus is based on the fact that the medium flowing past the resistor draws heat from the resistor the amount of which is dependent on the rate and the density of the flow. The resistance value of the temperature-dependent resistor is thereby changed, so that a measurement of the resistance permits a conclusion to be drawn on the flow rate of the medium. However, it has proved to be advantageous not to determine the resistance directly but to use a control device which maintains the temperature of the temperature-dependent resistor constant with respect to the flowing medium. In order to also take into account the effect of the temperature of the flowing medium, the other branch of the bridge circuit includes another temperature-dependent resistor exposed to the flowing medium which compensates for the influence of temperature. As a measure of the flow rate, the current flowing through the bridge or the voltage drop along a temperature-independent bridge resistor may, for example, be used. Overall, this apparatus is well proven, particularly when used in the measurement of the amount of air supplied to an internal combustion engine, and it is already being used in many automotive vehicles.

It is to be noted, however, that situations may occur in which the apparatus is subjected to extreme conditions and full operational reliability and predetermined measuring accuracy may no longer be assured. An example of such a condition is the special case in which the internal combustion engine of a motor vehicle is switched off with the engine compartment hot while, however, the ignition key remains in a position in which battery voltage continues to be applied to the electrical system of the engine. In spite of the absence of the cooling effect of the flowing medium with the internal combustion engine at a standstill, the apparatus for measuring the flow rate will then continue to be functional. The control member for controlling the flow passing through the temperature-dependent measuring resistor controls the latter to very low values, resulting in a high power loss at the control member itself. Using conventional components, this power loss may cause the control member or parts thereof to reach temperatures of over 200° C. This may particularly reduce the reliability of the individual components of the apparatus.

SUMMARY OF THE INVENTION

By contrast, the method and apparatus of the invention afford the advantage of ensuring a reliable and accurate operation also under extreme operating conditions. Extreme loads at low flow rates can be avoided particularly by reducing the flow-rate dependent quantity in the presence of a flow rate which is below a predetermined threshold value.

Further, it has proved to be an advantage to carry out this reduction only for a predetermined period of time so that normal operation is resumed automatically as soon as the flow rate rises again.

As a criterion for the presence of a low flow rate, it has proved very suitable to use one of the following quantities: actual throughput quantity, rotational speed, and control signals for the electric fuel pump. If the invention is used in a motor vehicle, it is highly advantageous to choose one of the above-identified quantities which corresponds to an air throughput quantity lying below the no-load throughput quantity.

Further advantages of the invention will become apparent from the subsequent description in conjunction with the drawing and from the claims.

BRIEF DESCRIPTION OF THE DRAWING

The invention will now be described in more detail with reference to the drawing wherein:

FIG. 1 is a schematic of an embodiment of the apparatus according to the invention;

FIGS. 2A and 2B are diagrams of voltage versus time to explain the mode of operation of the embodiment of FIG. 1; and, FIG. 3 is a graph of the power dissipation in transistor 16 of FIG. 1 plotted against air flow.

DESCRIPTION OF THE PREFERRED EMBODIMENT OF THE INVENTION

The embodiment disclosed is based on a hot-wire air-flow sensor for an internal combustion engine to determine the amount of air supplied to the internal combustion engine. It is to be understood in this connection that the basic idea of the invention is not limited to such systems but may be applied to all systems for determining the flow rate of a flowing medium, utilizing at least one temperature-dependent resistor arranged in the flowing medium. This is done with a device applying a quantity dependent on at least the flow rate to this temperature-dependent resistor. In particular, the invention relates also to resistance-measuring devices which are not configured as a bridge circuit. Also, the special hardware configuration of the embodiment still to be explained is not to be construed as limiting the idea of the invention. Those in the art having knowledge of the idea of the invention will have no problems in devising suitable software for its implementation. If a microcomputer is provided for the evaluation of the flow-rate measuring signal, it is obvious to implement the method or the apparatus disclosed by suitable software tools.

Referring now to FIG. 1, reference numeral 10 identifies an amplifier having an inverting and a non-inverting input connected to respective diagonal circuit nodes of a bridge 11. The bridge 11 itself is made up of two bridge branches including resistors 12 and 13 and resistors 14 and 15, respectively, with particularly resistor 14 being configured as a temperature-dependent resistor exposed to the flowing medium.

In the present embodiment, the inverting input of amplifier 10 is applied to the connecting node between resistors 12 and 13, while the non-inverting input is applied to the connecting node between resistors 14 and 15. The connecting node between resistors 13 and 15 is connected to a fixed potential, particularly to ground. The connecting node between resistors 12 and 14 is connected to the emitter of a control member in the form of a transistor 16 having its collector connected to battery voltage or an available supply voltage. Inserted between the output of amplifier 10 and the supply voltage $U_{Bat}$ is a voltage divider made up of resistors 17 and 18. Further, circuit node 19 between the two resistors 17, 18 is connected to the base of transistor 16. The mode of operation of this circuit configuration is sufficiently known from pertinent literature and may be understood from the above-mentioned U.S. Pat. No. 3,747,577 which is incorporated herein by reference.

The invention now provides an additional unit 20 having two inputs 21 and 22 and one output 23. With a switch 24 in the position shown as a solid line, input 21 is connected to the non-inverting input of amplifier 10. In this position, the voltage $U_{15}$ present at the non-inverting input is a measure of the throughput quantity of the flowing medium. With switch 24 in the position shown by broken lines, input 21 receives rotational speed signals (n) or control signals (EKP) from the electric fuel pump. In the embodiment shown, switch 24 is to be understood symbolically, meaning that input 21 does not receive various signals alternately but that a number of possibilities exist to apply signals to input 21. Generally, all signals indicative of a lower throughput quantity, particularly a throughput quantity equal to zero, are suitable for use. For the special case of an internal combustion engine, this is understood to include also signals which indicate a standstill condition of the engine.

Input 21 of additional unit 20 is connected to a comparator 25 having its second input at a reference voltage $U_{Ref}$. The output of comparator 25 is connected to a timing component 26 which, in turn, is connected to the base of a transistor 28 via a resistor 27. The emitter of transistor 28 is connected to ground whereas the collector thereof is connected to circuit node 19 via output 23 of additional unit 20. A circuit lead shown in broken lines leads from the base of transistor 28 to input 22. In various applications it has proved to be an advantage to provide a smoothing component between input 21 and comparator 25 which in the embodiment shown is made up of a resistor 29 and a capacitor 30.

The mode of operation of the circuit configuration described with reference to FIG. 1 will now be explained with reference to the diagrams of FIGS. 2A and 2B.

In FIG. 2A, voltage $U_{15}$ or $\overline{U}_{15}$ (filtering is of no relevance for the schematic shown) is plotted against time and is proportional to the flow rate of the flowing medium. FIG. 2B shows the output voltage $U_{26}$ of timing component 26 likewise as a function of time. Until a time $T_1$, the flow rate of the flowing medium, particularly the amount of air flowing through the intake pipe of an internal combustion engine, assumes values which exceed a lower limit, particularly the no-load air quantity. Under certain circumstances it may be necessary to filter the voltage $U_{15}$ in order to preclude the impact of pulsations in the intake pipe. At time $T_1$, the vehicle operator switches off the engine while leaving the ignition on. Switching off the internal combustion engine will cause the rate of air flow to fall to values in the zero range, so that also the voltage $U_{15}$ or $\overline{U}_{15}$ drops to values below the reference voltage $U_{Ref}$. Reference voltage $U_{Ref}$ is advantageously chosen so that it is in the range of between the no-load throughput quantity and zero throughput quantity.

If $\overline{U}_{15}$ falls below the value of reference voltage $U_{Ref}$, the output of comparator 25 will set the timing component 26 which is particularly configured as an edge-triggered monoflop. For the predeterminable duration of time $T_{26}$, the output of comparator 25 remains at a level causing transistor 28 to become conducting. As a consequence, transistor 16 will be cut off, so that heating current $I_{14}$ is not permitted to flow through resistor 14, thereby avoiding a power loss at transistor 16. After time $T_{26}$ of timing component 26 has elapsed, which in the special embodiment can also be advantageously preset in dependence on operating parameters, transistor 28 is cut off while transistor 16 becomes conducting. After a time $T_E$ has elapsed, which is given by the transients of the circuit, $\overline{U}_{15}$ will again drop below the threshold predetermined by $U_{Ref}$ and restart the process just described.

The mean power loss occurring in transistor 16 in this clocked operation is essentially determined from the ratio of time $T_{26}$ to transient time $T_E$. At time $T_2$ conditions are present because of the starting of the internal combustion engine which cause the rate of air flow to rise to high values. Therefore, $U_{15}$ ($\overline{U}_{15}$) ceases to drop below threshold value $U_{Ref}$, so that normal measuring conditions apply.

The second input 22 of additional unit 20 serves to provide an additional influencing function in dependence on various parameters. Thus, for example, it is conceivable to cut off transistor 28 via a start signal, permitting the starting process to be initiated without delay, that is, without having to wait for time delay $T_{26}$ of timing component 26 to elapse. It is understood that apparatus for measuring the flow rate of a flowing medium, which are not used in internal combustion engines, use other criteria for switching transistor 28 in or out.

Before discussing FIG. 3 of the drawing, reference is first made to the situations discussed in the second paragraph under the heading "Background of the Invention". The operating condition of a motor vehicle as described here can lead to a thermal overloading of the control member for controlling the current flowing through the temperature-dependent measuring resistor, namely the transistor 16 of FIG. 1. This is because in this special operating condition, virtually the entire power loss occurs in this transistor 16. If one would make measurements on transistor 16 of power dissipation versus air flow, the graph of FIG. 3 would be obtained. The power transferred in the control member (transistor 16) is shown as a function of the throughput of the flowing medium or air mass $\dot{m}$. The solid curve shows the dissipated power for the control member in the context of a conventional apparatus. From FIG. 3 it is apparent that even when there is no throughflow ($\dot{m}=0$), the control member is still burdened with power dissipation P1. In the most unfavorable situation, the thermal overload of the control member occurs which is described in the above-mentioned second paragraph under the heading "Background of the Invention".

According to the invention, the power dissipation occurring at the control member (transistor 16 in FIG. 1) is greatly reduced when there is a drop beneath the throughflow mass $m_1$ which corresponds to the threshold value $P_{TH}$ shown in FIG. 3. In the ideal situation, the value 0 is reached. This corresponds to the curve shown by dashed-dotted line in FIG. 3. In this way, overloading of the control member is completely precluded and the reliability of the motor vehicle is substantially increased.

It is understood that the foregoing description is that of the preferred embodiments of the invention and that various changes and modifications may be made thereto without departing from the spirit and scope of the invention as defined in the appended claims.

What is claimed is:

1. Method of determining the flow-rate of a flowing medium such as the mass of air conducted to an internal combustion engine, the method comprising the steps of:
    placing a temperature-dependent resistor in the flowing medium;
    applying a quantity such as an electric current from an apparatus to the resistor, the quantity being dependent upon said flow-rate; and,
    reducing said quantity to approximately zero in response to a flow-rate value lying below a predetermined threshold value.

2. The method of claim 1, comprising the further step of reducing said quantity for a predetermined period of time.

3. The method of claim 1, said threshold value being set to values falling in a range of flow-rate values between zero and a second characteristic value.

4. The method of claim 3, wherein the air mass rate of flow is determined for internal combustion engines, said second characteristic value being determined by an air mass rate of flow beneath the value thereof corresponding to idle.

5. The method of claim 4, said method being applicable over the entire range of operation of said engine except start.

6. The method of claim 5, comprising the step of ascertaining the presence of a rate of flow value beneath said predetermined threshold value via at least one of the following quantities: a rate of flow dependent quantity, rotational speed of the engine and control signal for an electric fuel pump connected to the engine.

7. The method of claim 1 wherein said quantity is reduced to zero.

8. Apparatus for determining the flow rate of a flowing medium such as the mass of air conducted to an internal combustion engine comprising:
    resistance measuring means for supplying an electrical signal indicative of the flow rate of a flowing medium, said resistance measuring means including a temperature-dependent resistor disposed in the flowing medium;
    current control means for controlling the flow of current through said resistor; and,
    comparator means having an output connected to said current control means, said comparator means being connected for comparing said signal to a threshold value and being configured for influencing said current control means so as to cause the flow of current through said resistor to be reduced to approximately zero.

9. The apparatus of claim 8 for the special case wherein said apparatus is applied to an internal combustion engine, said threshold value being set to values beneath those corresponding to the air throughput quantity of said engine at idle.

10. The apparatus of claim 8 wherein said flow of current through said resistor is reduced to zero.

11. Apparatus for determining the flow rate of a flowing medium such as the mass of air conducted to an internal combustion engine, the apparatus comprising:
    resistance measuring means for supplying an electrical signal indicative of the flow rate of a flowing medium, said resistance measuring means including a temperature-dependent resistor disposed in the flowing medium;
    current control means for controlling the flow of current through said resistor; and,
    comparator means for comparing input signals with a threshold value and for influencing said current control means so as to cause the flow of current through said resistor to become less for values of said signal less than said threshold value, said input signals being selected from the group consisting of signals proportional to the rotational speed of the engine and control signals for the electric fuel pump.

12. The apparatus of claim 11, wherein a time function is provided that determines the length of time of the reduction of the current flow.

13. The apparatus of claim 11, said current control means being influenced so as to cause the flow of current through said resistor to be reduced at least to almost zero.

14. The apparatus of claim 11 for the special case wherein said apparatus is applied to an internal combustion engine, said threshold value being set to values beneath those corresponding to the air throughput quantity of said engine at idle.

15. The apparatus of claim 14, comprising means for preventing said current control means from being activated by the output of said comparator means during the start condition of said engine.

16. Method of determining the flow-rate of a flowing medium such as the mass of air conducted to an internal combustion engine, the method comprising the steps of:
    placing a temperature-dependent resistor in the flowing medium;
    applying a quantity such as an electric current from an apparatus to the resistor, the quantity being dependent upon said flow-rate;
    reducing said quantity for a predetermined period of time in response to a flow-rate value lying below a predetermined threshold value; and,
    said apparatus having a predetermined transient time intrinsic thereto and said predetermined period of time being selected to be equal to or greater than said predetermined transient time.

17. Apparatus for determining the flow rate of a mass of air conducted to an internal combustion engine comprising:
    resistance measuring means for supplying an electrical signal indicative of the flow rate of a flowing medium, said resistance measuring means including a temperature-dependent resistor disposed in the flowing medium;
    current control means for controlling the flow of current through said resistor;
    comparator means having an output connected to said current control means, said comparator means being connected for comparing said signal to a threshold value and being configured for influencing said current control means so as to cause the flow of current through said resistor to become less for values of said electrical signal less than said threshold value;
    means for preventing said current control means from being activated by the output of said comparator means during the start condition of engine; and,
    said threshold value being set to values beneath those corresponding to the air throughput quantity of said engine at idle.

* * * * *